United States Patent [19]

Landmeier et al.

[11] Patent Number: 5,235,142
[45] Date of Patent: Aug. 10, 1993

[54] PHASE REFERENCE SYSTEM FOR CORDLESS LOOPING DIGITIZER

[75] Inventors: Waldo L. Landmeier; James S. Watson, both of Phoenix, Ariz.

[73] Assignee: CalComp, Inc., Anahiem, Calif.

[21] Appl. No.: 760,563

[22] Filed: Sep. 16, 1991

[51] Int. Cl.$^5$ ............................................. G08C 21/00
[52] U.S. Cl. ...................................... 178/19; 331/166
[58] Field of Search ................... 178/18, 19; 340/709; 331/106, 173, 183, 165, 166

[56] References Cited

U.S. PATENT DOCUMENTS 4,873,499 10/1989 Algor .............................. 331/173 X
5,073,685 12/1991 Kobayashi et al. .................. 178/18

Primary Examiner—Stafford Schreyer
Attorney, Agent, or Firm—Donald A. Streck; Wm. F. Porter, Jr.

[57] ABSTRACT

In a cordless, electro-magnetic digitizing system having a drive circuit outputting a square wave drive signal of known initial polarity to a transducer coil in a cursor to oscillate the transducer coil and cause a magnetic field output therefrom which is detected in an associated tablet, a method of operation and associated apparatus for determining the phase of a response signal induced by the magnetic field from the response signal itself. The method comprises the steps of, outputting bursts of a square wave drive signal of known initial polarity to the transducer coil; outputting a signal indicating the start of each burst to the transducer coil; additively outputting a single large current square wave signal pulse to the transducer coil of the same polarity and in phase with a first square wave pulse of the square wave drive signal when initially outputting a burst of the square wave drive signal to the transducer coil whereby additive initial drive currents cause the transducer coil to oscillate immediately and produce a detectable first half-wave in a response signal in the tablet; and, employing the first half-wave of the response signal of known polarity to determine the phase.

6 Claims, 2 Drawing Sheets

PHASE REFERENCE SYSTEM FOR CORDLESS LOOPING DIGITIZER

BACKGROUND OF THE INVENTION

This invention relates to cordless digitizer systems and, more particularly, to a drive circuit for outputting a square wave drive signal of known initial polarity to a transducer coil in the cursor of a cordless, electro-magnetic digitizing system to oscillate the transducer coil and cause a magnetic field output therefrom which is detected in an associated tablet wherein the phase of a response signal induced by the magnetic field can be determined from the response signal itself comprising, first logic circuit means for outputting bursts of a square wave drive signal of known initial polarity at a first output thereof and for outputting a signal indicating the start of a burst at a second output thereof, the first output being connected to the transducer coil; and, second logic circuit means connected to the second output and to the transducer coil for additively outputting a single large current square wave signal pulse to the transducer coil of the same polarity and in phase with a first square wave pulse of the square wave drive signal when the first logic circuit means is initially outputting a burst of the square wave drive signal to the transducer coil whereby additive initial drive currents cause the transducer coil to oscillate immediately and produce a detectable first half-wave in a response signal in the tablet thereby allowing detection of the phase of the response signal from the first half-wave of the response signal of known polarity.

In a digitizer system, a cursor is moved over the surface of a tablet by a user to effect data input. In many digitizer systems, the cursor is physically connected to the tablet by a connecting cable. This allows the position determination logic associated with the tablet to know what is happening at both the cursor and tablet and makes the job of positional determination much easier. In an electro-magnetic digitizer system with a driven coil, an AC electrical signal is connected to a coil in the cursor through the cable. The signal causes the coil to emit a changing magnetic field that induces signals into the wires of a grid system in the tablet. The wires of the grid system are sequentially and alternatively scanned in the X and Y directions of an X-Y coordinate system associated with the tablet. The size of the signal in the respective wires of the X and Y grids changes with proximity to the position of the cursor (i.e. the coil). Most important, the phase of the signal changes from one side of the coil to the other since the magnetic field from the coil cuts the wires in opposite directions from one side of the coil to the other. Using this data knowledge, the positional logic can then use interpolation techniques well known in the art to find the point where the signal passes through zero (i.e. changes phase) and, thereby, the exact position of the cursor.

Elimination of the cord between the cursor and the tablet can provide many benefits to a user in the way of convenience of use. This is particularly true in large tablet systems where the cord can become long and cumbersome. Thus, more recently, cordless digitizer systems have been made available commercially. In a cordless digitizer system, there are many technical advantages to employing an electro-magnetic approach such as that described above for a cord-connected system. Because very low signal levels are employed in digitizer systems in general, they are susceptible to outside interference from various sources of radiation that can be present in the environment of use such as cathode ray tube displays, and the like. An electro-magnetic system allows the designer and builder to maximize the valid data from the signal of interest while minimizing the effects of undesired interference such as electrostatic fields.

In a cordless looping digitizer system as developed by the assignee of this application, a battery operated circuit within the cordless cursor outputs bursts of a square wave drive source voltage signal as depicted in FIG. 1 which causes an oscillating circuit response output in and from the coil as shown in FIG. 2. As indicated at 10 in FIG. 2, the initial response is so low that the detecting circuitry and logic in the tablet is unable to detect and determine the phase of the signal. As a consequence, a third, seven-wire loop has been disposed in the tablet in combination with the two X and Y grid loops from which to obtain a phase reference signal. While the extra looping does provide the required phase reference signal, it also adds to the manufacturing costs and design flexibility of the digitizer. Additionally, flexible cordless looping digitizers will not work if an aluminum shield is employed as in other digitizers and system errors can occur due to added resistance and the capacitance of the phase reference loop.

Wherefore, it is the object of this invention to provide a means of causing the coil to transmit an easily-detectable pulse which will identify the polarity of the transmitted signal which can be combined with a simple detection method to eliminate the zero° or 180° ambiguity that occurs in systems using a looping polarity sensitive technique.

Other objects and benefits of the invention will become apparent from the detailed description which follows hereinafter when taken in conjunction with the drawing figures which accompany it.

SUMMARY

The foregoing object has been achieved in a drive circuit outputting a drive signal of known initial polarity to a transducer coil in the cursor of a cordless, electro-magnetic digitizing system to oscillate the transducer coil and cause a magnetic field output therefrom which is detected in an associated tablet, by the improvement of the present invention to allow determination of phase of a response signal induced by the magnetic field from the response signal itself comprising, output determination means for sensing when the drive circuit is initially outputting the drive signal to the transducer coil; and, supplemental signal generation means for additively outputting a single large current signal pulse to the transducer coil in combination with the drive signal when the output determination means senses that the drive circuit is initially outputting the drive signal to the transducer coil whereby additive initial drive currents cause the drive circuit to oscillate the transducer coil quickly and produce a detectable first half-wave in a response signal in the tablet thereby allowing determine of the phase of the response signal from the first half-wave of the response signal.

In a preferred embodiment, the drive circuit outputs a square wave drive signal and the supplemental signal generation means outputs a square wave the large current signal pulse.

DESCRIPTION OF THE PREFERRED EMBODIMENT

Figure 1:
FIG. 1 is a drawing of the drive source voltage signal employed in a typical prior art, electro-magnetic, cordless looping digitizer.
Figure 5:
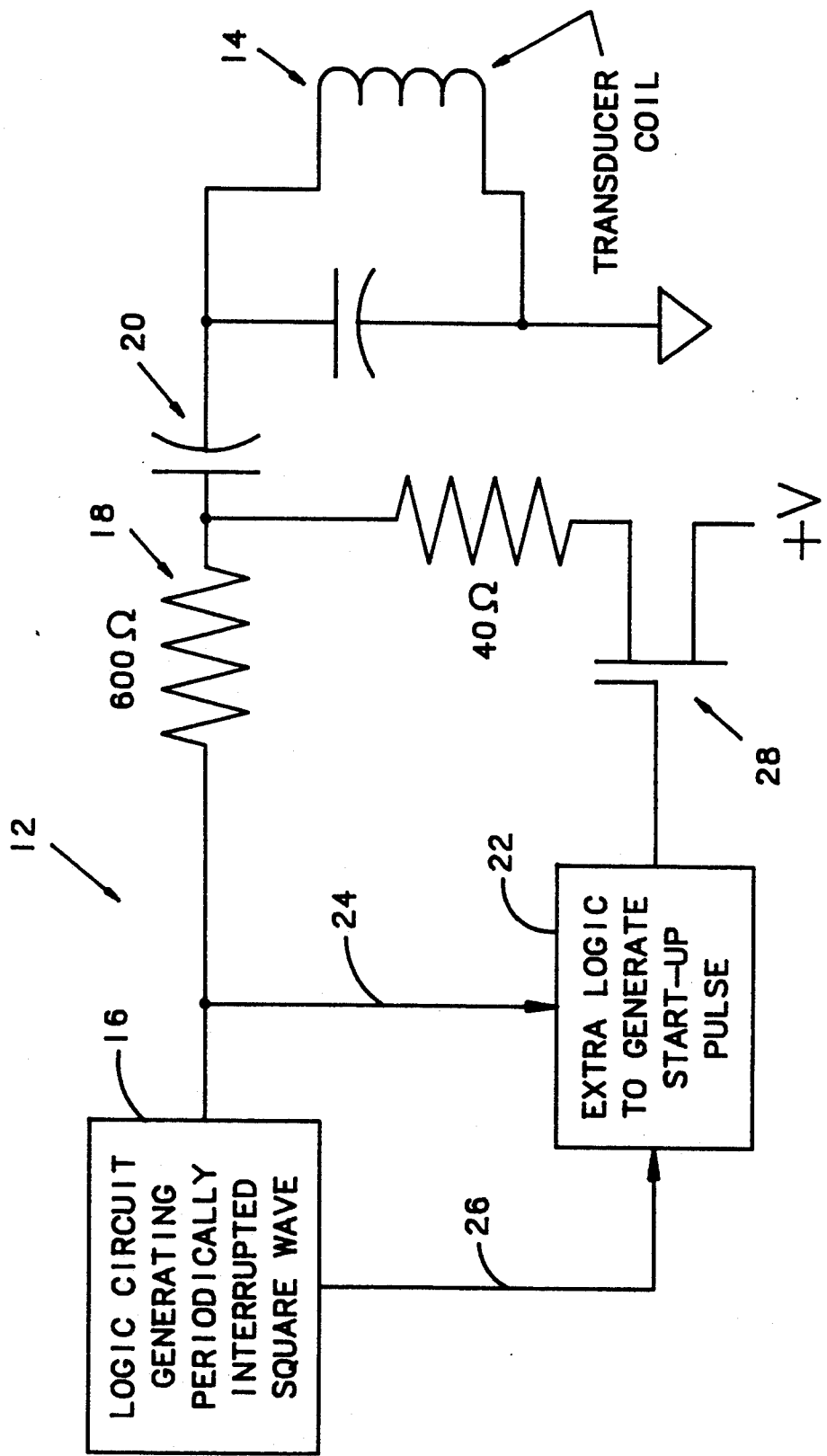
FIG. 5 is a partial functional block diagram of a circuit for implementing the present invention in an electro-magnetic, cordless looping digitizer.

FIG. 5 is a drawing of a circuit 12 which can be employed to drive the transducer coil 14 of a cordless looping digitizer's cursor according to the present invention. The transducer coil 14 is driven by the logic circuit 16 to generate the bursts of square wave as depicted in FIG. 1. The output of the logic circuit 16 passes through the resistor 18 and the capacitor 20 to the transducer coil 14 in the usual manner.

To achieve the objective of the present invention, the initial output from the transducer coil 14 is made to be of sufficient magnitude so as to be clearly detectable and identifiable. The objective of the present invention can be achieved in this manner because the output of the logic circuit 16 is always of the same polarity or phase. Thus, even though the tablet logic (not shown) is not physically connected to the cursor and the cursor is, therefore, completely asynchronous to the tablet logic, the tablet logic knows that the first signal from an output burst is of a pre-established polarity. Therefore, if the very first pulse of an output burst can be made to produce a detectable signal, the tablet logic will know the polarity/phase of the signal that caused it. Once the phase is established, the tablet logic can process the signal in the usual manner to determine the position of the transducer coil 14 (and, thereby, the cursor).

Figure 2:
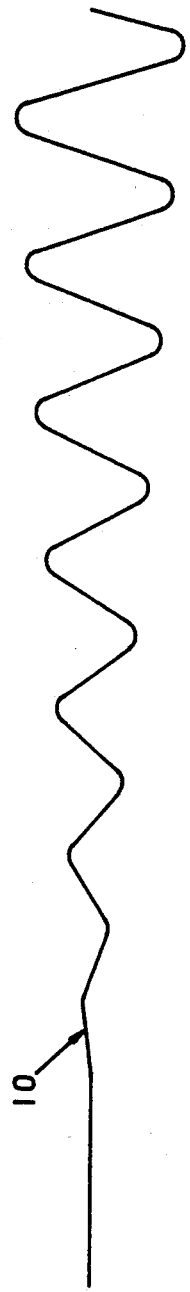
FIG. 2 is a drawing of the transducer coil circuit response of a typical prior art, electro-magnetic, cordless looping digitizer.
Figure 3:
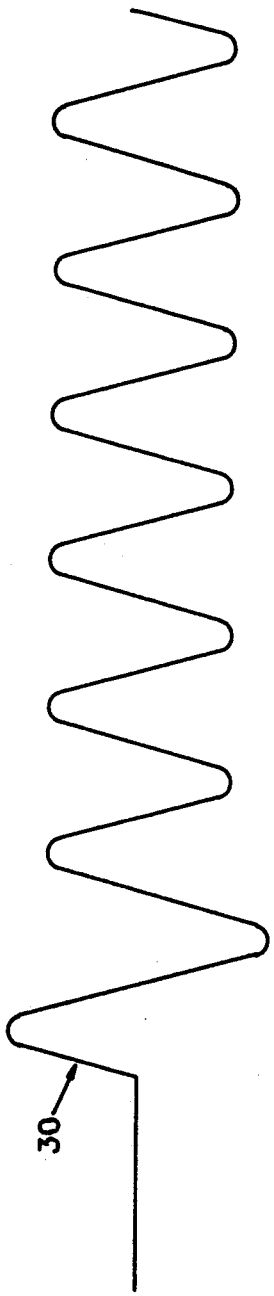
FIG. 3 is a drawing of the transducer coil circuit response of an electro-magnetic, cordless looping digitizer according to the present invention.
Figure 4:
FIG. 4 is a drawing of the supplemental signal employed at the beginning of each output burst in the present invention to generate a high energy startup pulse.

To implement the foregoing approach and achieve the objective thereby, there is extra logic 22 for generating a startup pulse as shown in FIG. 4. The extra logic 22 has two inputs. The first, at 24, is the square wave output from the logic circuit 16. The second, at 26, is a signal indicating each first drive cycle of a burst being output from the logic circuit 16. When the extra logic 22 detects a first drive cycle indicated on line 26, it sends a control signal to the transistor 28, which causes the transistor to conduct. As a consequence, a large current square wave signal, as shown in FIG. 4, is added to the first drive cycle square wave signal coming from the logic circuit 16. Thus, instead of slowly beginning to oscillate in the prior art manner as depicted in FIG. 2, this additive initial drive current causes the circuit to oscillate quickly, thereby allowing easy detection of the polarity of the first half-wave of transducer output as indicated at 30 in FIG. 3. Since, as a result of the effects of the present invention as depicted in circuit 12, the first half-cycle at 30 is easily detectable, the phase can be determined therefrom as will be apparent to those skilled in the art from the drawing of FIG. 3. Thus, no separate phase-indicating circuitry is required as the detection circuitry can readily determine phase from the response signal itself.

Wherefore, having thus described the present invention, what is claimed is:

1. In a drive circuit outputting a drive signal of known initial polarity to a transducer coil in the cursor of a cordless, electro-magnetic digitizing system to oscillate the transducer coil and cause a magnetic field output therefrom which is detected in an associated tablet, the improvement to allow determination of phase of a response signal induced by the magnetic field from the response signal itself comprising:

a) output determination means for sensing when the drive circuit is initially outputting the drive signal to the transducer coil; and, b) supplemental signal generation means for additively outputting a single large current signal pulse to the transducer coil in combination with the drive signal when said output determination means senses that the drive circuit is initially outputting the drive signal to the transducer coil whereby additive initial drive currents cause the drive circuit to oscillate the transducer coil quickly and produce a detectable first half-wave in a response signal in the tablet thereby allowing determine of the phase of said response signal from said first half-wave of said response signal.

2. The improvement to a drive circuit of a cordless, electro-magnetic digitizing system of claim 1 wherein:

a) the drive circuit outputs a square wave drive signal; and, b) said supplemental signal generation means outputs a square wave constituting said large current signal pulse.

3. A drive circuit for outputting a square wave drive signal of known initial polarity to a transducer coil in the cursor of a cordless, electro-magnetic digitizing system to oscillate the transducer coil and cause a magnetic field output therefrom which is detected in an associated tablet wherein the phase of a response signal induced by the magnetic field can be determined from the response signal itself comprising:

a) logic circuit means for outputting bursts of a square wave drive signal of known initial polarity at an output thereof, said output being connected to the transducer coil;

b) output determination means for sensing when said logic circuit means is initially outputting a burst of said square wave drive signal to the transducer coil; and c) supplemental signal generation means for additively outputting a single large current square wave signal pulse to the transducer coil of the same polarity and in phase with a first square wave pulse of said square wave drive signal when said output determination means senses that logic circuit means is initially outputting a burst of said square wave drive signal to the transducer coil whereby additive initial drive currents cause the transducer coil to oscillate immediately and produce a detectable first half-wave in a response signal in the tablet thereby allowing determination of the phase of said response signal from said first half-wave of said response signal of known polarity.

4. The drive circuit for outputting a square wave drive signal to a transducer coil in the cursor of a cordless, electro-magnetic digitizing system of claim 3 wherein:

said output determination means comprises a signal output from said logic circuit means connected to said supplemental signal generation means signally when said logic circuit means outputs a burst of said square wave drive signal to the transducer coil.

5. A drive circuit for outputting a square wave drive signal of known initial polarity to a transducer coil in the cursor of a cordless, electro-magnetic digitizing system to oscillate the transducer coil and cause a magnetic field output therefrom which is detected in an associated tablet wherein the phase of a response signal induced by the magnetic field can be determined from the response signal itself comprising:

a) first logic circuit means for outputting bursts of a square wave drive signal of known initial polarity at a first output thereof and for outputting a signal indicating the start of a burst at a second output thereof, said first output being connected to the transducer coil; and, b) second logic circuit means connected to said second output and to the transducer coil for additively outputting a single large current square wave signal pulse to the transducer coil of the same polarity and in phase with a first square wave pulse of said square wave drive signal when said first logic circuit means is initially outputting a burst of said square wave drive signal to the transducer coil whereby additive initial drive currents cause the transducer coil to oscillate immediately and produce a detectable first half-wave in a response signal in the tablet thereby allowing detection of the phase of said response signal from said first half-wave of said response signal of known polarity.

6. In a cordless, electro-magnetic digitizing system having a drive circuit outputting a square wave drive signal of known initial polarity to a transducer coil in a cursor to oscillate the transducer coil and cause a magnetic field output therefrom which is detected in an associated tablet, a method of operation to determine the phase of a response signal induced by the magnetic field from the response signal itself comprising the steps of:

a) outputting bursts of a square wave drive signal of known initial polarity to the transducer coil;

b) outputting a signal indicating the start of each burst to the transducer coil;

c) additively outputting a single large current square wave signal pulse to the transducer coil of the same polarity and in phase with a first square wave pulse of the square wave drive signal when initially outputting a burst of the square wave drive signal to the transducer coil whereby additive initial drive currents cause the transducer coil to oscillate immediately and produce a detectable first half-wave in a response signal in the tablet; and, d) employing the first half-wave of the response signal of known polarity to determine the phase.

* * * * *